US010200461B2

(12) United States Patent
Tino

(10) Patent No.: US 10,200,461 B2
(45) Date of Patent: Feb. 5, 2019

(54) VIRTUALIZED CAPACITY MANAGEMENT

(71) Applicant: Virtustream IP Holding Company LLC, Bethesda, MD (US)

(72) Inventor: Clayton Tino, Atlanta, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 304 days.

(21) Appl. No.: 15/093,548

(22) Filed: Apr. 7, 2016

(65) Prior Publication Data

US 2017/0295224 A1  Oct. 12, 2017

(51) Int. Cl.
G06F 9/46 (2006.01)
H04L 29/08 (2006.01)
G06F 9/50 (2006.01)
G06F 9/455 (2018.01)

(52) U.S. Cl.
CPC ........ H04L 67/1008 (2013.01); H04L 67/101 (2013.01); *G06F 9/45558* (2013.01); *G06F 9/46* (2013.01); *G06F 9/505* (2013.01)

(58) Field of Classification Search
CPC ........ G06F 9/45558; G06F 9/505; G06F 9/46; H04L 67/101; H04L 12/2602; H04L 12/2411
USPC ............. 718/1, 105; 709/201, 202, 223, 224
See application file for complete search history.

(56) References Cited

U.S. PATENT DOCUMENTS

| 5,884,037 | A | 3/1999 | Aras et al. |
| 6,574,587 | B2 | 6/2003 | Waclawski |
| 8,341,270 | B2* | 12/2012 | Mazzaferri ........... G06F 3/1415 709/217 |
| 8,402,468 | B2 | 3/2013 | Seidman et al. |
| 8,499,066 | B1 | 7/2013 | Zhang et al. |
| 8,745,205 | B2* | 6/2014 | Anderson ............. H04L 9/3213 709/224 |
| 9,218,207 | B1 | 12/2015 | Neuse et al. |
| 9,563,480 | B2* | 2/2017 | Messerli ............... G06F 9/5072 |
| 9,830,193 | B1* | 11/2017 | Wagner ................ G06F 9/5077 |
| 2008/0271038 | A1* | 10/2008 | Rolia ..................... G06F 9/505 718/105 |

(Continued)

FOREIGN PATENT DOCUMENTS

| CN | 101719081 A | 6/2010 |
| CN | 101938416 A | 1/2011 |

(Continued)

OTHER PUBLICATIONS

P. Garbacki et al., "Efficient Resource Virtualization and Sharing Strategies for Heterogeneous Grid Environments," 10th IFIP/IEEE International Symposium on Integrated Network Management, May 2007, 10 pages.

(Continued)

*Primary Examiner* — Frantz Coby
(74) *Attorney, Agent, or Firm* — Ryan, Mason & Lewis, LLP

(57) ABSTRACT

A projection agent processor may generate a projection of future workload demand for at least one virtual resource based on historical demand data for the at least one virtual resource, wherein the workload comprises a total demand for virtual resources from a single source. An action agent processor may effect at least one configuration change for the at least one virtual resource in accordance with the projection.

32 Claims, 8 Drawing Sheets

(56) References Cited

U.S. PATENT DOCUMENTS

| | | | |
|---|---|---|---|
| 2009/0216883 A1* | 8/2009 | Fellenstein | G06F 9/5011 709/224 |
| 2011/0209156 A1 | 8/2011 | Box et al. | |
| 2011/0264805 A1 | 10/2011 | Breitgand et al. | |
| 2011/0307901 A1 | 12/2011 | Blanding et al. | |
| 2012/0324445 A1 | 12/2012 | Dow et al. | |
| 2013/0019011 A1 | 1/2013 | Breitgand et al. | |
| 2013/0055262 A1 | 2/2013 | Lubsey et al. | |
| 2013/0067181 A1 | 3/2013 | Boldyrev et al. | |
| 2013/0218547 A1 | 8/2013 | Ostermeyer et al. | |
| 2014/0089922 A1* | 3/2014 | Lang | G06F 9/45558 718/1 |
| 2014/0258446 A1* | 9/2014 | Bursell | G06F 15/177 709/217 |
| 2015/0288571 A1 | 10/2015 | Baughman et al. | |
| 2017/0090961 A1* | 3/2017 | Wagner | G06F 9/45533 |

FOREIGN PATENT DOCUMENTS

WO          2012163217 A1    12/2012
WO  PCT/US2017/026398    6/2017

OTHER PUBLICATIONS

W. Wei et al., "Dynamic Correlative VM Placement for Quality-Assured Cloud Service," IEEE International Conference on Communications (ICC), Jun. 2013, pp. 2573-2577.

Rich Wolski, "Dynamically Forecasting Network Performance Using the Network Weather Service," Cluster Computing, May 1998, pp. 119-132, vol. 1, No. 1.

* cited by examiner

700

VIRTUALIZED CAPACITY MANAGEMENT

DETAILED DESCRIPTION OF SEVERAL EMBODIMENTS

Figure 1:
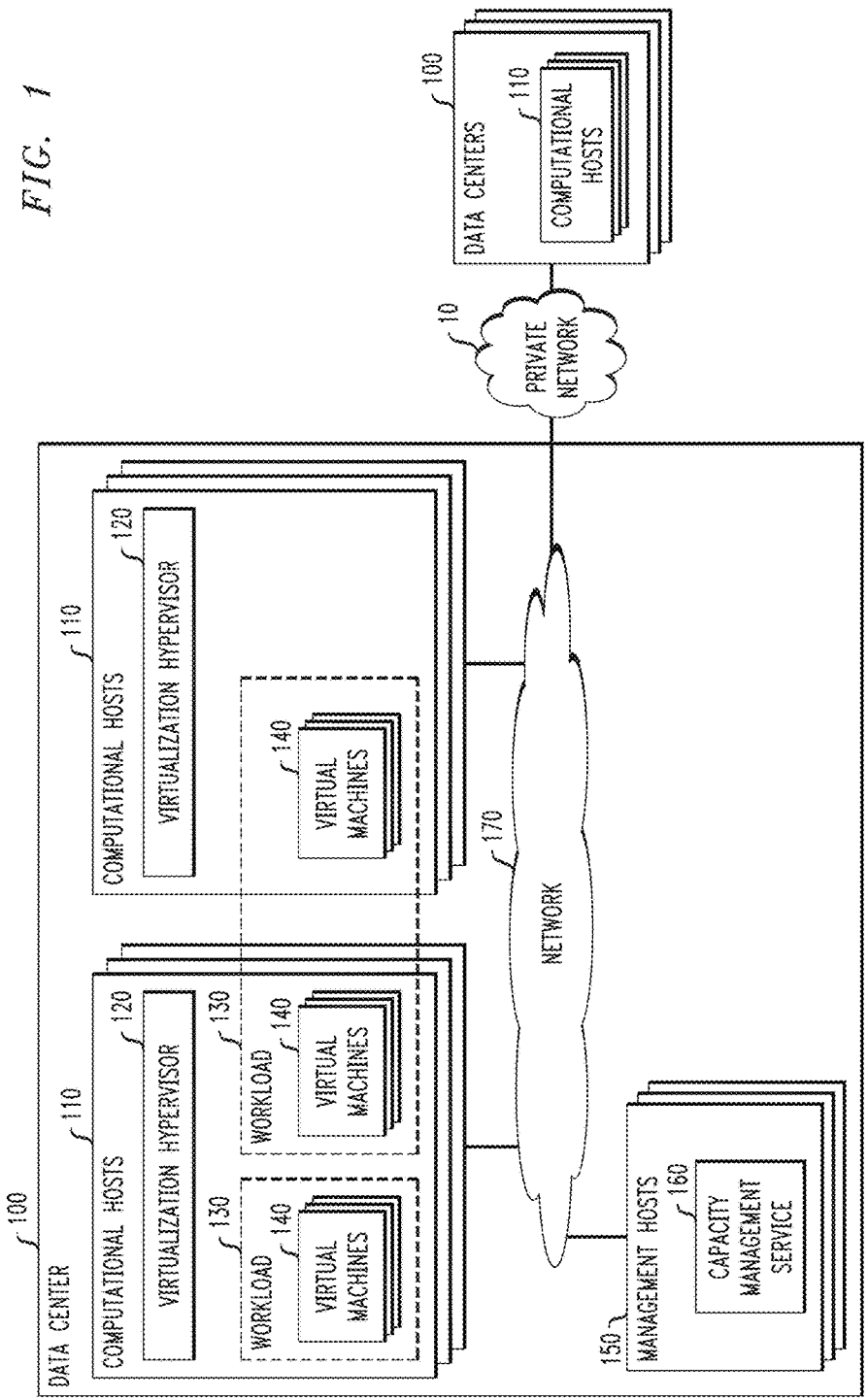
FIG. 1 is a network according to an embodiment of the invention.

A virtualized computer infrastructure or platform is a collection of physical computing machines, managed by a hardware virtualization hypervisor, which provides physical computational resources to software implementations of physical machines called "virtual machines." Virtual machines may be managed as the smallest consumer of infrastructure resources or as another managed container providing virtualized physical interfaces to individual software processes. As the hardware resources required by a single virtual machine or software process may be lower than those provided by a single physical machine comprising a portion of the virtualized computer infrastructure, a virtualized infrastructure may provide resources to, or "host," many virtual machines or software processes. Hosted virtual machines or software processes utilizing virtualized infrastructure resources are herein referred to as "consumers." "Capacity" in the context of a virtualized infrastructure may provide a measure of the physical computational resources available across the virtualized infrastructure to host such virtual machines or software processes. These resources may be characterized in terms of physical hardware attributes that may include, but are not limited to, metrics such as the total available processing resources (e.g., CPU availability) and the total physical memory available for use.

Over any given period of time, a single consumer may utilize varying amounts of infrastructure capacity across multiple measurable hardware attributes. In order to mitigate the effects of this consumption instability, access to hardware resources may be managed in terms of entitlements to and limits on units of hardware resources. An infrastructure unit may be a predefined grouping of physical computational resources representing a common measure of disparate computational resources. The capacity of a virtualized computer infrastructure may be be measured in terms of the total number of infrastructure units available for consumption by virtual machines or software processes rather than across a series of individual hardware metrics.

Virtual computer infrastructures may host workloads originating from a variety of sources, where a workload is an aggregation or grouping of multiple consumers. For example, a workload may comprise a grouping of virtual machines working for a common source (e.g., a common customer or tenant). These workloads may constitute the sum total demand for system resources from a single source. Though the resource consumption of a single consumer may vary rapidly over time, the aggregate demand for infrastructure units across a workload may be more stable against longer time horizons. As a result, entitlements to and limits on hardware resources by proxy of the infrastructure unit may be more safely defined for aggregate workloads rather than individual virtual machines or software processes themselves. Rather than guaranteeing a minimum number of infrastructure units available to or limiting the consumption of infrastructure units on a per-consumer basis, these entitlements and limits may be defined across workloads from common sources, allowing for more efficient use of the virtualized computer infrastructure.

Determining an appropriate level of entitlement to and limits on system resources for a given workload may be a complex process. Over-restricting a workload's entitlement to infrastructure units may lead to adverse operational effects on the individual virtual machines or software processes comprising the workload. Conversely, failing to set adequate limits on the number of infrastructure units available for consumption by a workload may lead to both operational inefficiency as well as the potential for future infrastructure resource starvation via over provisioning. The systems and methods described herein may be used to appropriately set these entitlement and limit levels and thereby enable active management of the infrastructure.

The rationale for managing workloads by aggregate consumption may extend beyond resource utilization efficiency. As previously mentioned, the aggregate demand for infrastructure units may be more stable across longer time horizons when compared to the resource demands of individual virtual machines or software processes. Some embodiments of the systems and methods described herein may prescribe a virtualized computer infrastructure capacity management methodology utilizing a series of hardware, firmware, and/or software agents to, on a recurring basis, monitor and aggregate the capacity consumption across virtualized workloads consisting of multiple virtual machines or software process from a common source, project future capacity demand based on the observed time-history of capacity consumption, present a series of management decisions regarding the future entitlements to and limits on infrastructure units based on the confidences of the projected consumptions, and/or enable the configuration of entitlements to and limits on infrastructure units based on projected consumptions.

A monitoring agent may aggregate capacity consumption metrics across virtual machines and software processes comprising a sole-sourced workload producing a measure of consumed infrastructure units as a function of time, thus describing the total capacity demand history of the workload.

A projection agent may generate a regression model of the total capacity demand based on a series of configurable methodologies which may include, for example, the total capacity demand of the workload modeled as a seasonal autoregressive integrated moving average (ARIMA) model; the total capacity demand of the workload decomposed into trend, seasonal, and high-frequency components by means of Loess decomposition; the high-frequency component modeled by a stationary ARIMA model; and/or the resulting signals summed to produce an additive model of the capacity demand. The total capacity demand of the workload may be modeled as the sum of a Fourier series representing a seasonal component of the capacity demand and a stationary ARIMA model. The resultant regression model may be used to project a series of forecasts describing the projected capacity demand at varying configurable confidence levels. The projection agent may present the projected capacity demand as a function of time for each configured confidence level over a given forecast time horizon. Each forecast may include an upper and lower limit on the expected capacity consumption for the workload at a given probabilistic confidence.

An action agent may accept values for entitlements to and limits on infrastructure units and may configure the virtualization hypervisor to guarantee or restrict access to virtualized computer infrastructure units for virtual machines or software processes of the virtual machine workload group.

Time-series modeling techniques may be utilized to produce probabilistic models of future capacity demand for workloads in a virtualized computer infrastructure. This information may be used to make capacity planning decisions, such as the appropriate selection of entitlements to and limits on infrastructure units based on projected workload consumptions. As the capacity demand projections are probability based, multiple demand forecasts may be presented, each representing a different confidence in the forecast. An infrastructure manager may weigh the value of the workload versus the risk associated with less confident forecasts when making management decisions.

Some embodiments may include an automated management system through which entitlements to and limits on infrastructure units may be automatically configured based on forecasts made at a preselected confidence level. Rather than relying on an infrastructure manager to manually intervene when capacity management actions are required, an action agent may automatically configure the virtualization hypervisor on a predetermined time horizon.

FIG. 1 is a network 10 according to an embodiment of the invention. Various network 10 elements may comprise one or more computers (e.g., "physical computing machines"). A computer may be a programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, physical machines, and other terms. Computers may facilitate communications between users and/or other computers, may provide databases, may perform analysis and/or transformation of data, and/or may perform other functions. Those of ordinary skill in the art will appreciate that those terms used herein are interchangeable, and any computer capable of performing the described functions may be used. For example, though the term "server" may appear in the specification, the disclosed embodiments are not limited to servers. In some embodiments, the computers used in the described systems and methods may be special purpose computers configured specifically for providing and/or provisioning virtual services as described in greater detail below.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connection). Connections between computers may use any protocols, including connection-oriented protocols such as TCP or connectionless protocols such as UDP. Any connection through which at least two computers may exchange data may be the basis of a network.

Network 10 may comprise one or more physical computing machines forming a virtualized computing infrastructure. These physical computing machines may be operated and maintained in a common facility referred to as a data center 100. A data center 100 may contain any number of physical computing machines, which may in turn host any number of virtualized infrastructure resource consumers, such as virtual machines or individual software processes. In some embodiments, two classifications of physical computing machines may be characterized as hosts for virtual machines or software processes: computational hosts 110 and management hosts 150. Computational hosts 110 may be those physical computing machines providing virtualized infrastructure resources to consumers. Management hosts 150 may be those physical computing machines providing virtualized infrastructure resources to virtual machines or software processes used to manage the operations of the data center 100 itself. A capacity management service 160 may be hosted on a management host 150 or series of management hosts 150 connected via a computer network 170. The management hosts 150 may be further connected to any number of computational hosts 110 via the computer network 170. Each computational host 110 may use a virtualization hypervisor 120 to provide capacity to be consumed by virtual machines 140 or other software processes. Recall that an aggregation of consumers of virtual infrastructure resources, such as virtual machines 140, originating from a single source is referred to as a workload 130. The virtual machines 140 or software processes constituting workload may span multiple computational hosts 110. In some embodiments, multiple data centers 100 may be connected via a secure or private computer network 10, allowing for workloads 130 to span multiple data centers 100.

Figure 2:
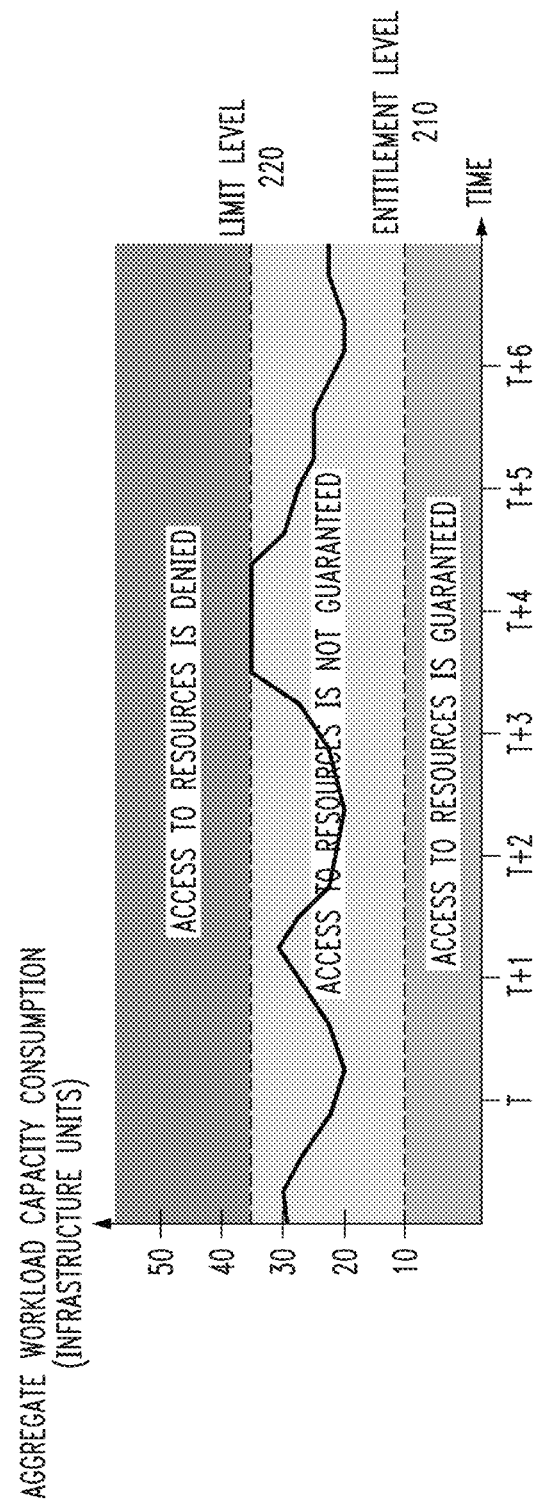
FIG. 2 is a graph of aggregate workload capacity consumption according to an embodiment of the invention.

FIG. 2 is a graph 200 of aggregate workload capacity consumption according to an embodiment of the invention. Though the capacity demand of individual consumers of virtualized infrastructure resources may vary rapidly over time, the capacity demand of a workload 130 may be more stable against longer time horizons, as such groupings of virtual machines 140 or software processes may reflect the seasonality inherent to the business tasks being performed by the machines or processes themselves. Virtualization hypervisors 120 may manage virtualized resources in aggregate by defining entitlements to and limits on the consumption of virtualized infrastructure by virtual machines 140 or software processes belonging to a single defined group, although those virtual machines 140 may span multiple computational hosts 110. Broadly, the capacity consumed by individual virtual machines 140 comprising a workload 130 may be summed and compared to the capacity rules defined for the workload 130. Based on the priority of virtual machines 140 within the workload 130, access to virtualized infrastructure resources at future times may be granted to or restricted from individual virtual machines 140 in order to ensure that the consumption across the entire workload 130 respects the defined infrastructure resource access rules for the workload 130.

An entitlement rule may instruct the virtualization hypervisor 120 to reserve a specified amount of virtualized infrastructure capacity (e.g., an entitlement level 210) for consumption by virtual machines 140 or software processes belonging to a single workload 130. For example, the sum of all reserved data center 100 capacity defined by entitlement rules may be less than or equal to the total capacity of the data center 100, meaning that a new entitlement rule cannot be enforced if it guarantees access to virtualized infrastructure resources already guaranteed to other workloads 130. Though the entitlement rule may guarantee access to virtualized resources, it may not restrict consumption of virtualized resources above the level specified. A workload 130 may consume virtualized infrastructure resources above the level defined by an entitlement rule, though these resources may also be consumed by virtual machines 140 or software processes belonging to other workloads 130 as well. In the event that multiple workloads 130 are consuming infrastructure capacity above guaranteed levels to the point that there are insufficient virtualized resources to satisfy the demand, the consuming workloads 130 are said to be "contending" for infrastructure resources.

A limit rule may specify the upper bound of the virtualized infrastructure capacity (e.g., a limit level 220) a workload 130 may consume. Contrary to the behavior of an entitlement rule, a limit rule may not necessarily have to reflect the current available capacity of the data center 100, as the limit rule may not guarantee access to resources. Instead, the limit rule may strictly limit the amount of virtualized infrastructure resources a workload 130 may potentially consume at any given time. Limit rules may be used to manage contention amongst workloads 130 sharing a common infrastructure (e.g., a common data center 100).

As workload demand for datacenter 100 capacity varies as a function of time, it may not always be efficient to set entitlement rules guaranteeing access to virtualized infrastructure resources for all workloads 130 based on the peak capacity demand of those workloads 130. Assuming that the overall capacity demand of the workload 130 may rise and fall over time, there may be potential for large portions of a data center's virtualized infrastructure to go unused at any point. Active management of both entitlement and limit rules may lead to efficiencies in virtualized infrastructure utilization, given insight into the expected capacity demands of individual workloads 130. The virtualized computer infrastructure capacity management methodology described herein may provide such insight.

Figure 3:
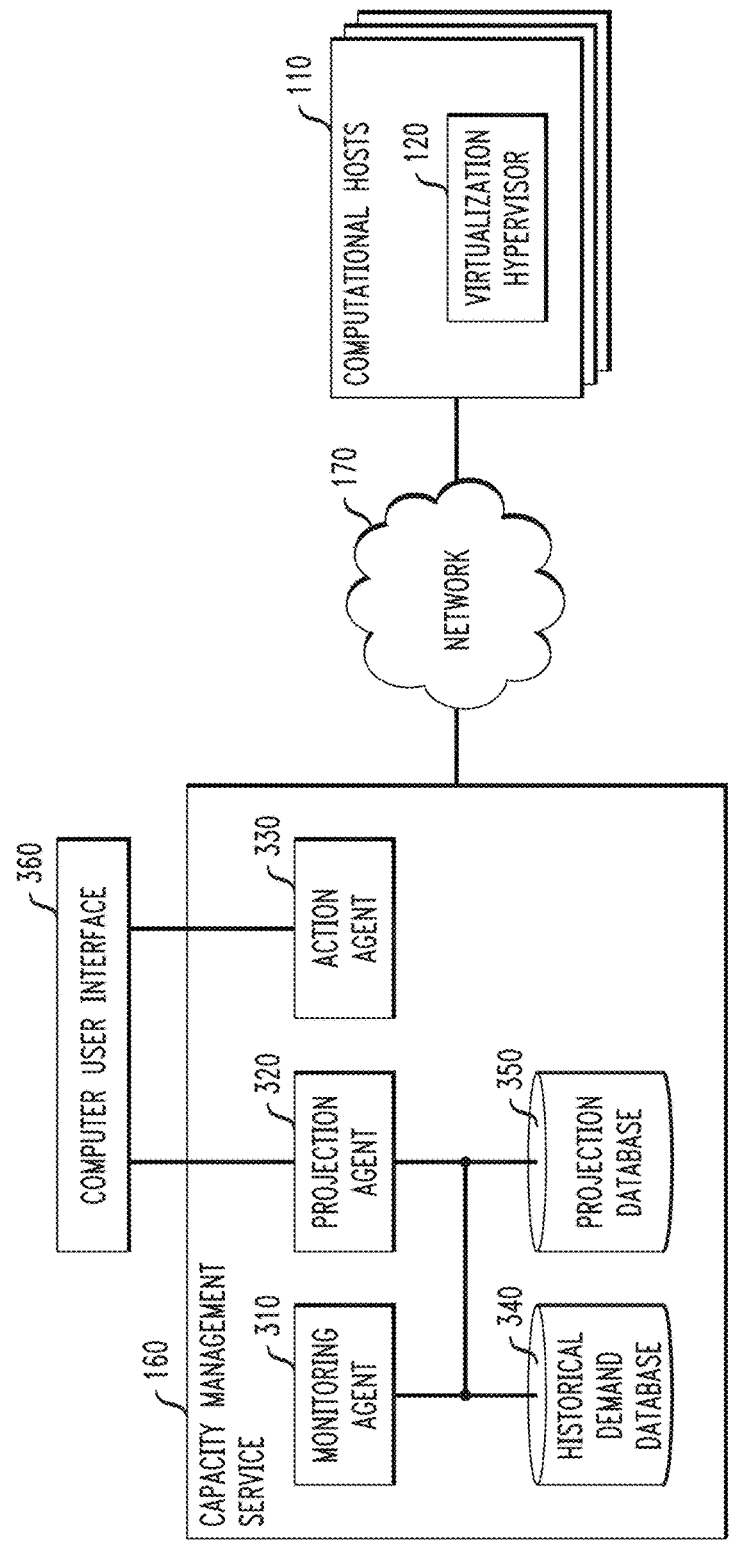
FIG. 3 is a capacity management service and network according to an embodiment of the invention.

FIG. 3 is a capacity management service 160 and network 170 according to an embodiment of the invention. The capacity management service 160 may be hosted on a management host 150 within a data center 100 and may be connected via a computer network 170 to any number of computational hosts 110, managed by virtualization hypervisors 120, providing virtualized computer infrastructure resources to any number of virtual machines 140 or software processes. The capacity management service 160 may include at least three hardware, software, and/or firmware agents that may perform information gathering, forecasting, and virtualization management functions described in greater detail below. For example, a monitoring agent 310 may gather information, a projection agent 320 may forecast workload 130 demand, and an action agent may manage virtualization performed in one or more computational hosts 110. These agents may store and/or access data in a historical demand database 340 and projection database 350. Additionally, these agents may present information and/or receive inputs via a user interface 360.

Figure 4:
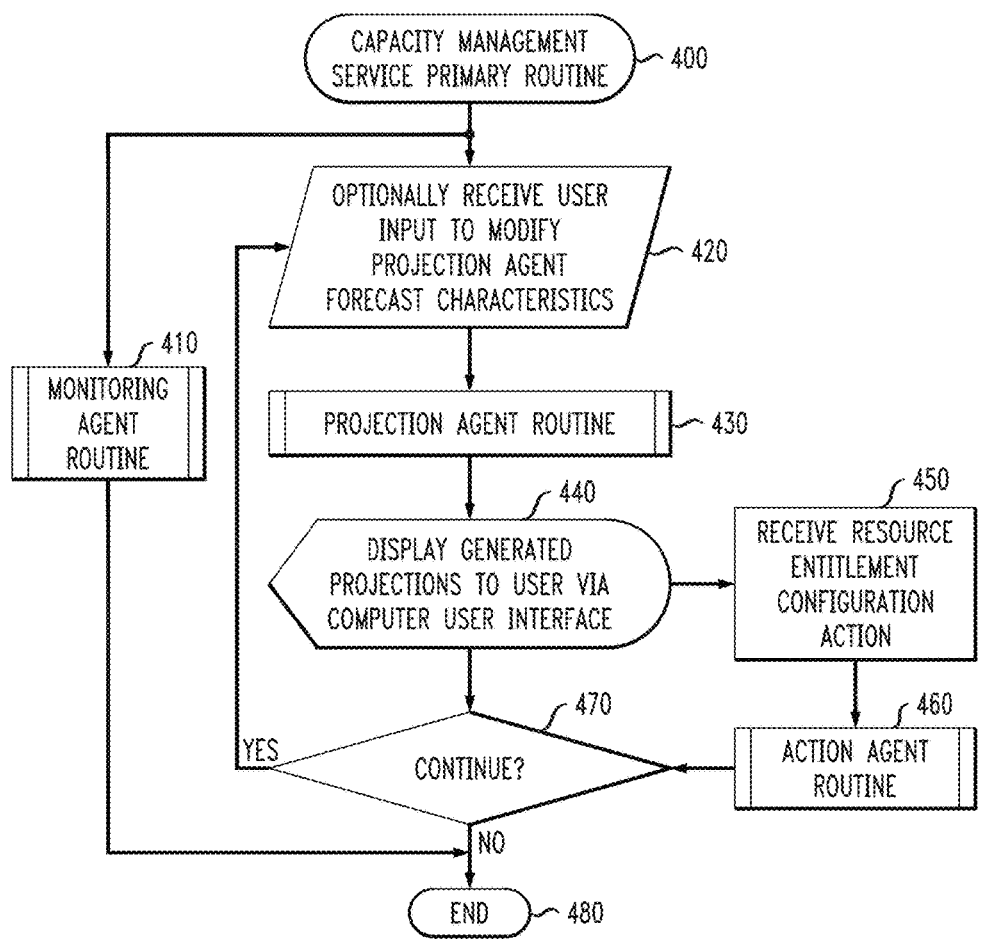
FIG. 4 is a capacity management process according to an embodiment of the invention.

FIG. 4 is a capacity management process 400 according to an embodiment of the invention. An embodiment of the capacity management service 160 may include a single primary routine, but may also potentially include a series of three subroutines, each belonging to one of the three agents described above. Each subroutine is described in further detail below. The monitoring agent routine 410 and projection agent routine 430 may execute asynchronously until terminated 480. The projection agent routine may execute using preconfigured default input values, but in some cases, user input to modify projection agent forecast characteristics may be received 420 and used by the projection agent routine 430. The resulting projections may be displayed to a user 440. When a resource entitlement configuration action is received 450, either due to human intervention or automated action generation, the action agent routine 460 may be executed. After action is taken by the action agent routine, it may be determined whether projecting is to continue 470. If so, projection may be repeated as described above.

Figure 5:
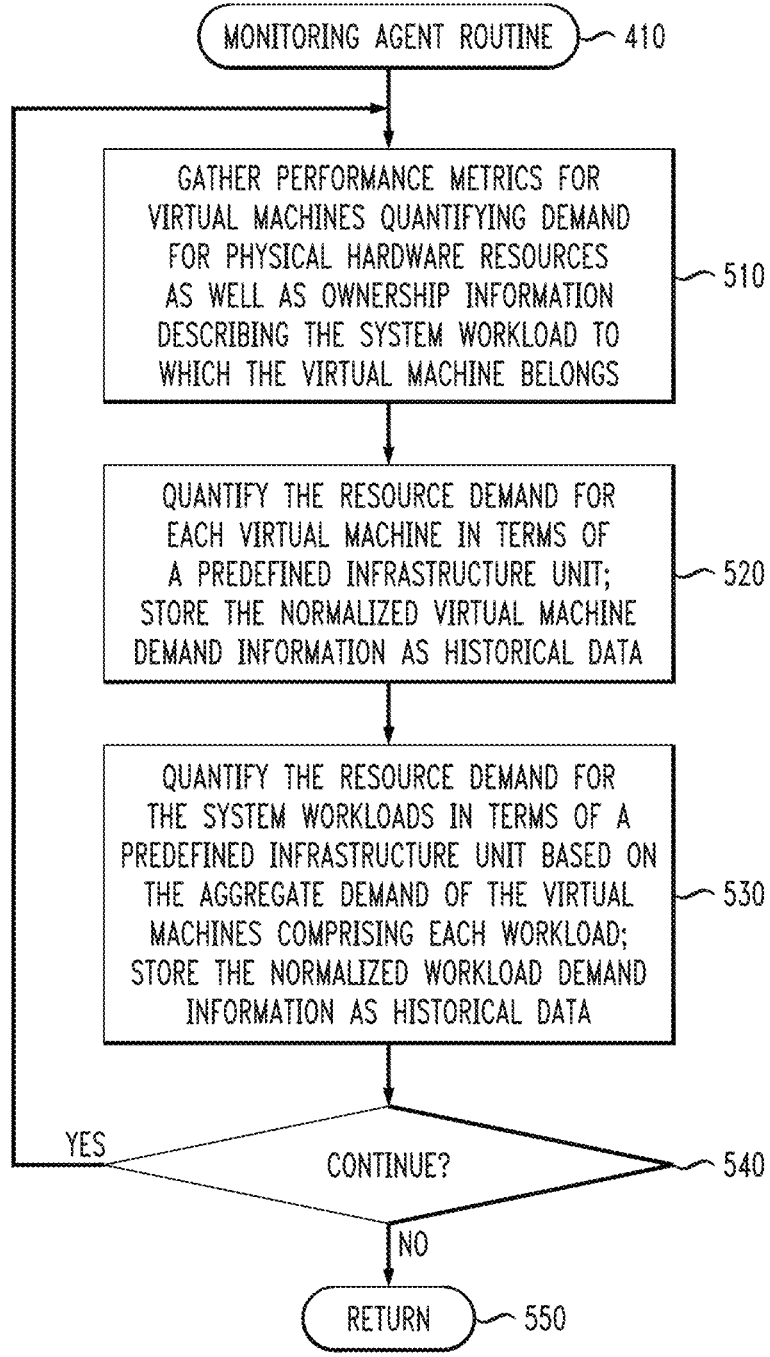
FIG. 5 is a monitoring process according to an embodiment of the invention.

FIG. 5 is a monitoring process (e.g., monitoring agent routine 410) according to an embodiment of the invention. An embodiment of the monitoring agent 310 may gather time-coded virtualized computer infrastructure resource consumption metrics from the virtualization hypervisors 120 accessible via the connected computer network 510. These resource consumption measurements may be characterized in terms of physical hardware attributes that can include, but are not limited to, metrics such as the total processing resources (CPU) consumed and the total physical memory consumed, for example. The frequency at which the hypervisor 120 records these metrics may be configured to any sampling frequency. The hypervisor 120 may persist these measurements for some predefined period of time in the event that the routine execution period is longer than the sampling frequency. These collected measurements may be correlated to individual virtual machines 140 or software processes and ultimately the workload 130 to which the individual virtual machine 140 or software process belongs.

Once correlated to consumer and workload, the individual metrics may be normalized to the common infrastructure unit, reflecting a scaling of the original capacity consumption measurement along a predefined grouping of physical computational resources representing a common measure of disparate computational resources (e.g., the degree of scaling along each measured attribute may vary and it will be appreciated that the definition of the infrastructure unit itself does not limit the definition of other embodiments) 520. These values may be stored in a database (e.g., historical demand database 340) for later use.

The capacity demand for each workload may be calculated by summing the individual resource consumption metrics for each virtual machine 140 or software process of each workload 130 at each time code 530. These values, reflecting the capacity demand for each workload 130 as a function of time, may be stored in a database (e.g., historical demand database 340) for later use.

An embodiment of the projection agent routine may accept a variety of possible input parameters from the user via the computer user interface 360 or the routine may execute using a series of preconfigured default values. These parameters may include, but are not limited to:

A specific workload identifier. If no value is given, the routine may be executed for all known workloads.

A specific forecast confidence or series of forecast confidences. These values may be expressed in terms of values from 0 to 1, for example.

A specific modeling methodology selection parameter mapping a value for the parameter to a specific modeling methodology to be performed by the routine in the subsequent regression step.

A specific projection length signifying the length in future time along which to predict the future capacity demand.

Based on the passed parameters, the output of the routine may correspond to a single capacity demand forecast or a series of forecasts for multiple workloads 130 along multiple horizons and forecast confidence levels. In an example embodiment, the routine may generate forecasts for all known workloads 130 managed in the virtualized computer infrastructure 10 using preconfigured system default values for the forecast confidence, modeling methodology, and projection length parameters. As noted above, the routine may be repeated 540 and/or terminated 550.

Figure 6:
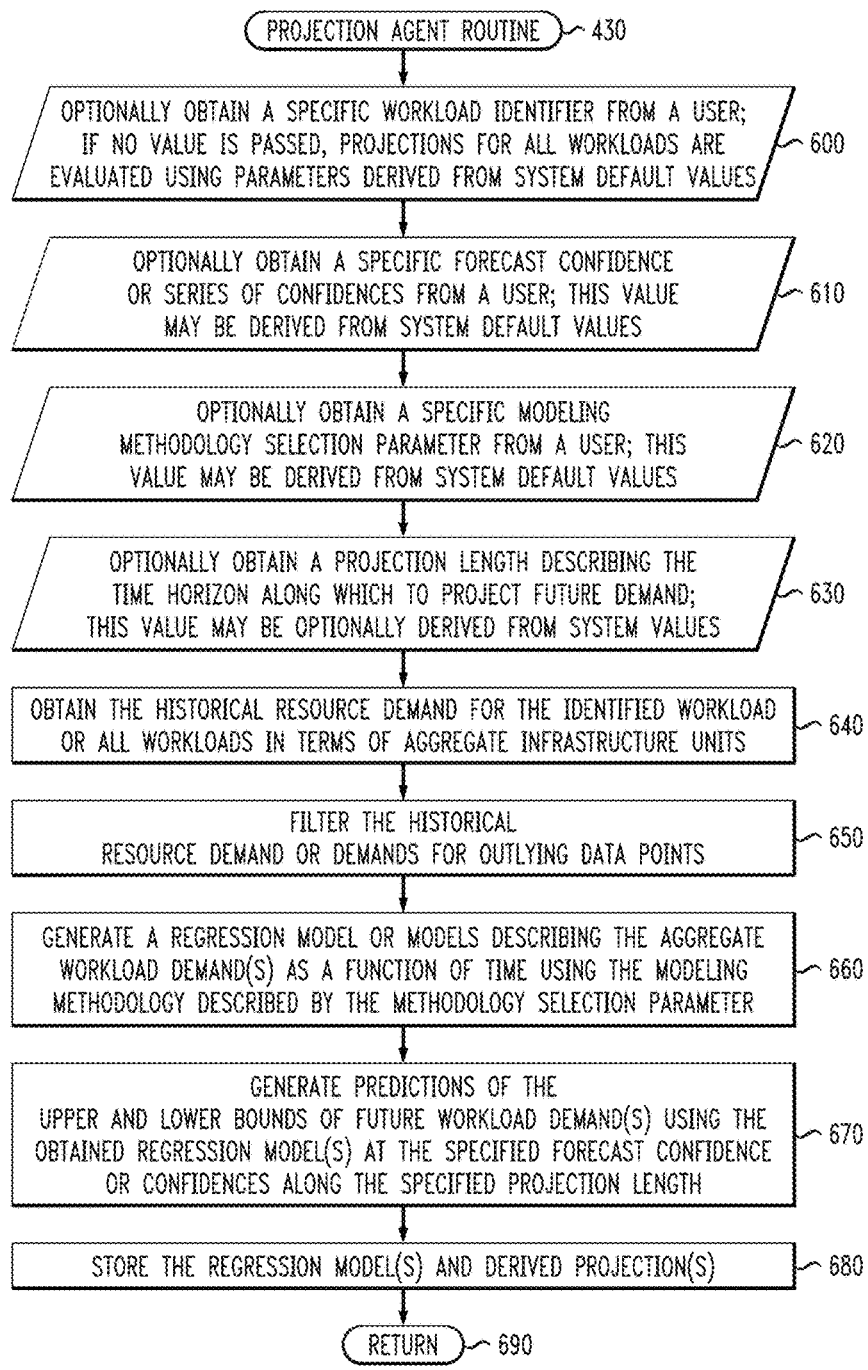
FIG. 6 is a projection process according to an embodiment of the invention.

FIG. 6 is a projection process (e.g., projection agent routine 430) according to an embodiment of the invention. A simple embodiment of the projection agent 320 may accept a single workload 130 identifier from a user and generate a single forecast along a single specified future time horizon. In other embodiments, the user may specify multiple workloads 130 and/or time horizons, or the projection agent 320 may automatically generate projections for all workloads 130 or some automatically chosen subset thereof.

For cases wherein a user wishes to specify one or more workloads 130 for projection, the projection agent 320 may receive one or more specific workload 130 identifiers from the user 600. The projection agent 320 may receive one or more specific forecast confidence values from the user, or these may be defined by default 610. The projection agent 320 may receive a selection of specific methodology from the user or define a methodology by default 620. The projection agent 320 may also receive a specified projection length from the user or define the length by default 630.

Whether a user specifies one or more criteria for the projection, or whether a default or preset projection of workloads 130 is generated, the projection agent 320 may proceed as follows. The historical capacity demand of the workload 130 in terms of infrastructure units may be obtained from the database populated by the monitoring agent 310 (e.g., historical demand database 340) 640. The historical capacity demand data may be sorted by time code and filtered for outlying values 650. The sorted data may be examined for sampling frequency consistency, and missing values may be reconstructed using one of many possible techniques which may include, but are not limited to, mean replacement, median replacement, or moving average replacement. The well-formed time series array of capacity demand for a workload 130 may be fit with a regression model using one of a series of configurable methodologies 650, which may include, but are not limited to:

- The prior capacity demand of the workload 130 may be fit with a seasonal integrated autoregressive moving average (ARIMA) regression model.
- The prior capacity demand of the workload 130 may be decomposed into trend, seasonal, and high-frequency components by means of Loess decomposition; the high-frequency component may be fit with a stationary ARIMA regression model; and the resulting regression may be summed with the trend and seasonal signals to produce an additive model of the demand capacity.
- The prior capacity demand of the workload 130 may be modeled as the sum of a Fourier series representing a seasonal component of the capacity demand and a stationary ARIMA model.

Each of the above methodologies may represent a time series regression technique for a time series data with seasonal components. The particular methodology used should not limit the scope of this embodiment, and other methodologies than those listed may be used in some embodiments. However, it should be noted that some embodiments may specifically exploit the seasonal nature of aggregate workload capacity demand to predict future capacity trends in a virtualized computer infrastructure. The resultant regression model may be used to simulate the future capacity demand of the workload via Monte Carlo simulation along the desired projection time interval or some other simulation method, and the predicted upper and lower bounds of the future capacity demand based on the specified forecast confidence level may be calculated 670. The regression model and demand projections may be stored for later use 680 (e.g., in the projection database 350). Once projections are determined for all workloads 130 of interest, the process may end 650.

Figure 7:
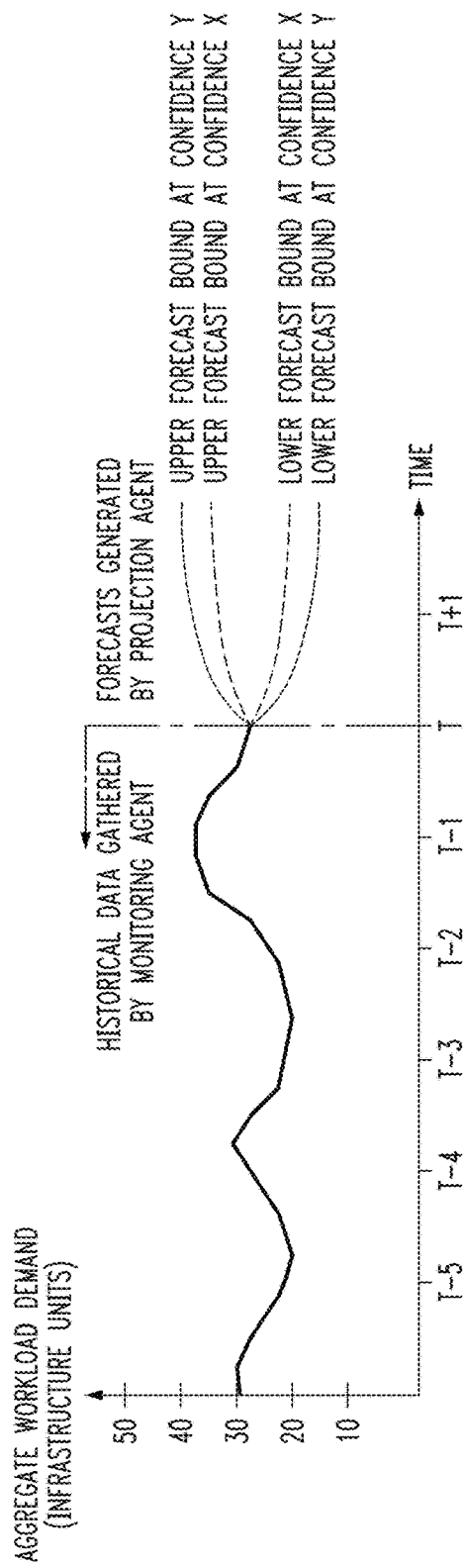
FIG. 7 is a projection according to an embodiment of the invention.

FIG. 7 is an example projection 700. Projections of workload 130 demand on virtualized computer infrastructure generated by the projection agent 320 may be made available to display to infrastructure managers via the computer user interface 360. An example of such a display 700 in one embodiment depicts the time history of the workload capacity consumption in terms of aggregate infrastructure consumed by virtual machines 140 or software processes belonging to the workload 130 as a function of time history. Future time may hold projections of the upper and lower boundaries of future infrastructure capacity demand for various confidence levels as specified by the user or system configuration. The infrastructure manager may use this information to make decisions regarding future entitlement and limit rules for individual workloads 130 based on the depicted prediction of the future workload 130 capacity, the predicted capacity demand of other workloads 130 sharing common virtualized computer infrastructure resources, and the level of risk the infrastructure manager is willing to assume given modifying entitlement or limit rules could possibly cause workloads 130 to contend for resources leading to service level agreement violations. As workload 130 demand projections may be probabilistic, the infrastructure manager may be required to properly assess the risk associated with entitlement or limit configuration changes while simultaneously balancing the possible efficiency benefits brought by reconfiguration actions.

Figure 8:
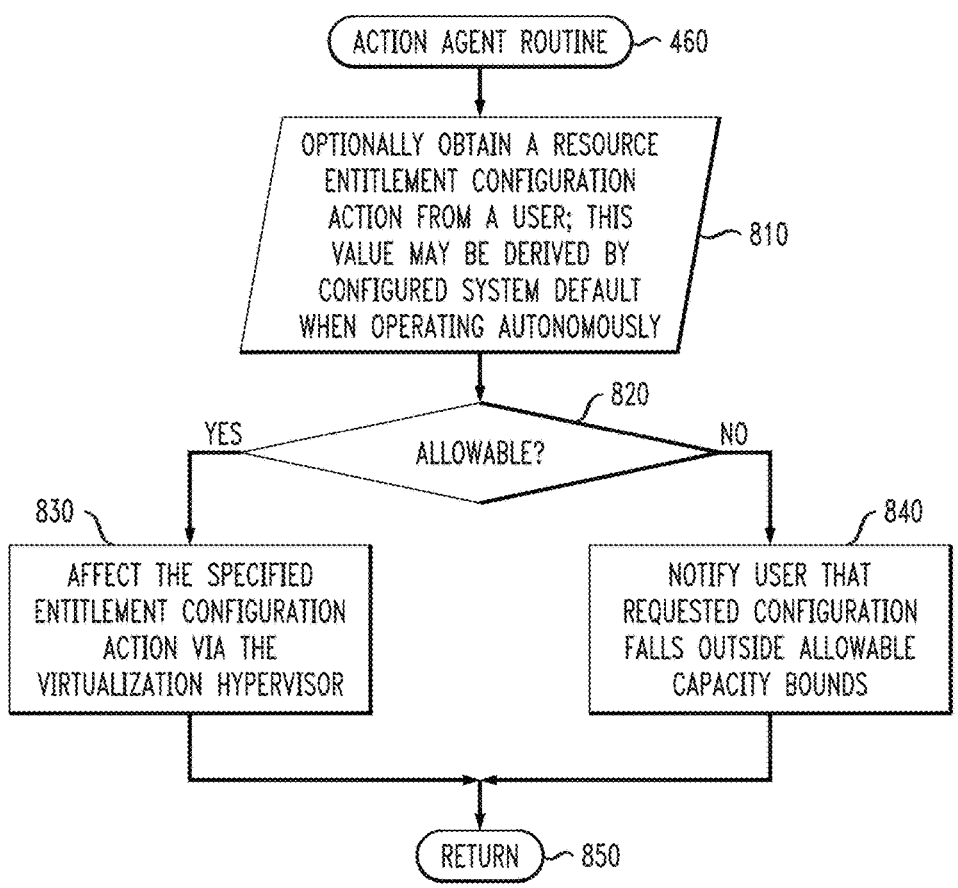
FIG. 8 is a management process according to an embodiment of the invention.

FIG. 8 is a management process (e.g., action agent routine 460) according to an embodiment of the invention. If the infrastructure manager decides to make a change to the entitlement or limit rules for a workload 130, the infrastructure manager may use the computer user interface 360 to input changes to the action agent 330. In addition to accepting user inputs to change resource allocations and entitlements, the action agent 330 may automatically analyze projections and make decisions about resource allocations and entitlements in much the same way as the infrastructure manager described above. In some embodiments, the action agent 330 may be configured to execute entitlement and limit rule changes without manual intervention by the infrastructure manager. Workloads 130 to be autonomously managed may be tagged with specific workload 130 capacity demand projection parameters for forecast confidence and projection length, and the action agent 330 may automatically select a specific value from the resultant capacity demand projections based on a series of predefined heuristics 810. One such non-limiting heuristic may be to select the maximum value of the upper bound of the projected capacity demand as the entitlement limit for the duration of the projection horizon, for example. In some embodiments, the action agent 330 may determine whether or not the entitlement or limit change is permissible based on system configuration 820. One such verification may be to ensure that a new entitlement setting would not guarantee more virtualized computer resources than are available within the data center 100, another such verification could check against a database of hard workload constraints signifying actions which require potential further authorization before being executed. Once the action is verified, the entitlement rule or limit rule configuration change may be effected by the action agent 330 communicating with the virtualization hypervisor 120 responsible for the changed resources over the computer network 170 via a defined interface. If the selected value is not allowable 820, the action agent 330 may notify a user 840. After the change is made or notification is provided, the process may end 850.

While various embodiments have been described above, it should be understood that they have been presented by way of example and not limitation. It will be apparent to persons skilled in the relevant arts that various changes in form and detail can be made therein without departing from the spirit and scope. In fact, after reading the above description, it will be apparent to one skilled in the relevant arts how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for managing virtual resource capacity, comprising:
    determining, for a given workload comprising two or more virtual resources from a single source, historical demand data for the two or more virtual resources by aggregating capacity consumption metrics across the two or more virtual resources as a measure of consumed infrastructure units as a function of time, the infrastructure units comprising predefined groupings of physical computational resources representing a common measure of disparate computational resources of the physical infrastructure on which the two or more virtual resources run;
    generating a projection of aggregate future workload demand for the two or more virtual resources of the given workload as a function of the infrastructure units based at least in part on the historical demand data for the two or more virtual resources; and
    effecting at least one configuration change for at least one of the two or more virtual resources in accordance with the projection of the aggregate future workload demand for the given workload;
    wherein the method is performed using at least one processing device comprising a processor coupled to a memory.

2. The method of claim 1, further comprising monitoring the two or more virtual resources to obtain the historical demand data.

3. The method of claim 2, wherein the monitoring comprises gathering at least one performance metric for at least one of the two or more virtual resources and ownership information describing the given workload to which the at least one virtual resource belongs.

4. The method of claim 2, wherein the monitoring comprises generating normalized virtual resource demand information for the two or more virtual resources by scaling capacity consumption measurements of the two or more virtual resources into the infrastructure units based at least in part on the predefined groupings of physical computational resources.

5. The method of claim 1, wherein the generating comprises filtering the historical demand data by sorting the historical demand data in terms of numbers of infrastructure units utilized at each of a plurality of time codes and removing outlying values.

6. The method of claim 1, wherein the generating comprises generating a regression model describing the aggregate future workload demand as a function of time.

7. The method of claim 6, wherein the generating further comprises:
    obtaining a modeling methodology from a user or selecting the modeling methodology automatically; wherein
    the regression model is generated according to the modeling methodology.

8. The method of claim 6, wherein the generating further comprises:
    generating a prediction of an upper bound of the aggregate future workload demand using the regression model; and
    generating a prediction of a lower bound of the aggregate future workload demand using the regression model.

9. The method of claim 8, wherein the generating further comprises:
    obtaining a forecast confidence from a user or selecting the forecast confidence automatically; wherein
    the prediction of the upper bound and the prediction of the lower bound are predicted at the forecast confidence.

10. The method of claim 8, wherein the generating further comprises:
    obtaining a projection length from a user or selecting the projection length automatically; wherein
    the projection length defines a time for which the prediction of the upper bound and the prediction of the lower bound are generated.

11. The method of claim 1, wherein the generating comprises obtaining a selection of the given workload from a user or selecting the given workload automatically.

12. The method of claim 1, wherein effecting the least one configuration change comprises:
    displaying, via a user interface, the projection; and
    receiving, via the user interface, a command defining the at least one configuration change.

13. The method of claim 12, wherein effecting the least one configuration change further comprises:
    determining whether the command defines a configuration change that falls outside an allowable capacity bound;
    in response to determining that the configuration change falls outside the allowable capacity bound, notifying, via the user interface, the user; and
    in response to determining that the configuration change does not fall outside the allowable capacity bound, effecting the defined configuration change.

14. The method of claim 1, wherein effecting the least one configuration change comprises:

automatically evaluating the projection; and
selecting the at least one configuration change based on the evaluating.

15. A system for managing virtual resource capacity, comprising:
at least one processing device comprising a processor coupled to a memory;
the at least one processing device being configured:
to determine, for a given workload comprising two or more virtual resources from a single source, historical demand data for the two or more virtual resources by aggregating capacity consumption metrics across the two or more virtual resources as a measure of consumed infrastructure units as a function of time, the infrastructure units comprising predefined groupings of physical computational resources representing a common measure of disparate computational resources of the physical infrastructure on which the two or more virtual resources run;
to generate a projection of aggregate future workload demand for the two or more virtual resources of the given workload as a function of the infrastructure units based at least in part on the historical demand data for the two or more virtual resources; and
to effect at least one configuration change for at least one of the two or more virtual resources in accordance with the projection of the aggregate future workload demand for the given workload.

16. The system of claim 15, wherein the at least one processing device is further configured to monitor the two or more virtual resources to obtain the historical demand data.

17. The system of claim 16, wherein the monitoring comprises gathering at least one performance metric for at least one of the two or more virtual resources and ownership information describing the given workload to which the at least one virtual resource belongs.

18. The system of claim 16, wherein the monitoring comprises generating normalized virtual resource demand information for the two or more virtual resources by scaling capacity consumption measurements of the two or more virtual resources into the infrastructure units based at least in part on the predefined groupings of physical computational resources.

19. The system of claim 15, wherein the generating comprises filtering the historical demand data by sorting the historical demand data in terms of numbers of infrastructure units utilized at each of a plurality of time codes and removing outlying values.

20. The system of claim 15, wherein the generating comprises generating a regression model describing the aggregate future workload demand as a function of time.

21. The system of claim 20, wherein the generating further comprises:
obtaining a modeling methodology from a user or selecting the modeling methodology automatically; wherein
the regression model is generated according to the modeling methodology.

22. The system of claim 20, wherein the generating further comprises:
generating a prediction of an upper bound of the aggregate future workload demand using the regression model; and
generating a prediction of a lower bound of the aggregate future workload demand using the regression model.

23. The system of claim 22, wherein the generating further comprises:

obtaining a forecast confidence from a user or selecting the forecast confidence automatically; wherein
the prediction of the upper bound and the prediction of the lower bound are predicted at the forecast confidence.

24. The system of claim 22, wherein the generating further comprises:
obtaining a projection length from a user or selecting the projection length automatically; wherein
the projection length defines a time for which the prediction of the upper bound and the prediction of the lower bound are generated.

25. The system of claim 15, wherein the generating comprises obtaining a selection of the given workload from a user or selecting the given workload automatically.

26. The system of claim 15, wherein effecting the least one configuration change comprises:
displaying, via a user interface, the projection; and
receiving, via the user interface, a command defining the at least one configuration change.

27. The system of claim 26, wherein effecting the least one configuration change further comprises:
determining whether the command defines a configuration change that falls outside an allowable capacity bound;
in response to determining that the configuration change falls outside the allowable capacity bound, notifying, via the user interface, the user; and
in response to determining that the configuration change does not fall outside the allowable capacity bound, effecting the defined configuration change.

28. The system of claim 15, wherein effecting the least one configuration change comprises:
automatically evaluating the projection; and
selecting the at least one configuration change based on the evaluating.

29. The method of claim 6, wherein the regression model comprises a seasonal integrated autoregressive moving average regression model.

30. The method of claim 6, wherein the regression model decomposes the historical demand data into a trend component, a seasonal component and a high-frequency component, the high-frequency component being fit with a stationary integrated autoregressive moving average model that is summed with the trend component and the seasonal component to produce an additive model of the historical demand.

31. The method of claim 6, wherein the regression model comprises a sum of a Fourier series representing a seasonal component of the historical demand and a stationary integrated autoregressive moving average model.

32. A computer program product comprising a non-transitory processor-readable storage medium having stored therein program code of one or more software programs, wherein the program code when executed by at least one processing device causes the at least one processing device:
to determine, for a given workload comprising two or more virtual resources from a single source, historical demand data for the two or more virtual resources by aggregating capacity consumption metrics across the two or more virtual resources as a measure of consumed infrastructure units as a function of time, the infrastructure units comprising predefined groupings of physical computational resources representing a common measure of disparate computational resources of the physical infrastructure on which the two or more virtual resources run;

to generate a projection of aggregate future workload demand for the two or more virtual resources of the given workload as a function of the infrastructure units based at least in part on the historical demand data for the two or more virtual resources; and to effect at least one configuration change for at least one of the two or more virtual resources in accordance with the projection of the aggregate future workload demand for the given workload.

* * * * *